United States Patent
Aoyama et al.

[11] Patent Number: 6,113,680
[45] Date of Patent: Sep. 5, 2000

[54] PIGMENTED INK AND PROCESS FOR PRODUCTION THEREOF

[75] Inventors: Shigeo Aoyama, Ibaraki-ken; Shoji Saibara, Todide; Yuichi Sakurai, Toride, all of Japan

[73] Assignee: Hitachi Maxell, Ltd., Osaka, Japan

[21] Appl. No.: 09/119,392

[22] Filed: Jul. 21, 1998

[30] Foreign Application Priority Data

Aug. 22, 1997 [JP] Japan ................................. 9-226292

[51] Int. Cl.⁷ .................................................. C09D 11/02
[52] U.S. Cl. ............................ 106/31.86; 106/31.65; 106/31.89; 106/499
[58] Field of Search ..................... 106/31.65, 31.86, 106/31.89, 499

[56] References Cited

U.S. PATENT DOCUMENTS

| | | | |
|---|---|---|---|
| 4,509,982 | 4/1985 | Iijima | 106/31.89 |
| 5,621,021 | 4/1997 | Yoshioka et al. | 106/31.67 |
| 5,658,376 | 8/1997 | Noguchi et al. | 106/31.59 |
| 5,954,866 | 9/1999 | Ohta et al. | 106/31.89 |

*Primary Examiner*—Helene Klemanski

[57] ABSTRACT

The present invention relates to a pigmented ink, in particular, an ink suitable for an ink-jet printing method comprising jet of ink droplets from a print head. More particularly, it relates to a pigmented ink excellent in the dispersibility and dispersion stability of pigment particles, storage stability, etc. There is provided a pigmented ink which comprises (1) an organic pigment having a surface made hydrophobic by adsorption thereon or binding thereto of an organic substance, (2) an amphiphilic compound composed of a poly(ethylene oxide) as a hydrophilic portion and an alkyl group and/or an aromatic group as a hydrophobic portion, and (3) water, and is excellent in the dispersion stability of pigment particles and storage stability by virtue of the above composition.

11 Claims, No Drawings

PIGMENTED INK AND PROCESS FOR PRODUCTION THEREOF

BACKGROUND OF THE INVENTION

The present invention relates to a pigmented ink, in particular, an ink suitable for an ink-jet printing method comprising jet of ink droplets from a print head. More particularly, it relates to a pigmented ink excellent in the dispersibility and dispersion stability of pigment particles, storage stability, etc.

Since dye-dissolved inks conventionally used for ink-jet recording have defects such as low lightfastness and waterfastness, pigmented inks excellent in lightfastness and waterfastness have come to be used in some cases. The pigmented inks have to contain dispersed water-insoluble pigment particles and have to be stably storable. For example, Japanese Patent Laid-Open Nos. 62-116678, 1-301760, 2-255875, 4-334870 and 8-209048 disclose water-based pigmented inks.

However, in these water-based pigmented inks, pigment fine particles with an average particle diameter of 100 nm or less are very difficult to use which have come to be used with a recent increase in the print quality of ink-jet printers. Even in some of the above references in which employment of such fine particles is taken into consideration, there are not described the re-dispersibility of pigment particles and the improvement of the print quality of pigmented ink. The smaller the diameter of pigment particles, the larger the specific surface area thereof and the much larger the number thereof per a unit volume. Therefore, the degree of the interaction between the pigment and a dispersant greatly affects the dispersibility and dispersion stability of the pigment.

SUMMARY OF THE INVENTION

An object of the present invention is to provide a pigmented ink used for ink-jet recording, in particular, a pigmented ink excellent in not only the dispersibility and dispersion stability of pigment particles but also storage stability which can be obtained by using pigment fine particles having an average particle diameter of 100 nm or less.

The pigmented ink of the present invention comprises at least (1) an organic pigment having a surface made hydrophobic by adsorption thereon or binding thereto of an organic substance, (2) an amphiphilic compound composed of a poly(ethylene oxide) as a hydrophilic portion and an alkyl group and/or an aromatic group as a hydrophobic portion, and (3) water. As the organic substance, there can be used organoalkoxysilanes, organosilazanes, and acetoalkoxyaluminum diisopropylates.

Organic pigments have a large number of hydrophobic groups (e.g. alkyl groups, aromatic groups, etc.) on he surface, and hence belong to the category of water-undispersible pigments having a strongly hydrophobic surface. According to our earnest investigation, the following is conjectured: the hydrophobic portion of the amphiphilic compound is adsorbed on the hydrophobic group of the organic pigment surface, and the hydrophilic portion of the amphiphilic compound extends into water to disperse particles of the pigment.

The following, however, has become apparent: some organic pigments do not have a high surface hydrophobicity because of the influence of hydrophilic groups and the like, and the above-mentioned amphiphilic compound is hardly adsorbed on such organic pigments, so that such organic pigments cannot be sufficiently dispersed in some cases by using the above-mentioned amphiphilic compound. In addition, when an organic pigment having no high surface hydrophobicity because of the influence of hydrophilic groups and the like is used, the interaction between the organic pigment and additives added for the prevention of clogging, the improvement of the storage stability, etc. becomes stronger than the interaction between the above-mentioned amphiphilic compound and the organic pigment in some cases, so that the addition of the additives greatly deteriorates the dispersibility and dispersion stability of pigment particles in some cases.

As a result of our earnest investigation, it has become apparent that even an organic pigment having no high surface hydrophobicity because of the influence of hydrophobicity groups and the like can be sufficiently dispersed by the use of an amphiphilic compound composed of a poly (ethylene oxide) as a hydrophilic portion and an alkyl group and/or an aromatic group as a hydrophobic portion, when an organic substance such as an organoalkoxysilane, organosilazane, acetoalkoxyaluminum diisopropylate or the like is adsorbed on or bonded to the pigment surface to make the pigment surface hydrophobic. Thus, the present invention has been accomplished.

DETAILED DESCRIPTION OF THE INVENTION

In the present invention, the amphiphilic compound may contain at least one member selected from the group consisting of carboxylic acid groups, carboxylic acid salt groups, sulfate ester groups, sulfate ester salt groups, sulfonic acid group, sulfonic acid salt groups, phosphoric ester groups and phosphoric ester salt groups, at the end of the poly(ethylene oxide) which is not bonded to the hydrophobic portion. As to each of the carboxylic acid salt groups, sulfate ester salt groups, sulfonic acid salt groups and phosphoric ester salt groups, the kind of the salt is not particularly limited. The salt includes, for example, salts with alkali metals, quaternary amines, etc.

The pigmented ink of the present invention preferably has a pH of 7 to 11. When its pH is lower than 7, the ink does not sufficiently permeate into paper in some cases. When the pH is higher than 11, the pigment in the pigmented ink is precipitated in some cases.

The amount of the pigment used in the present invention is 0.1 to 20 wt %, preferably 1.0 to 10 wt %, based on the weight of the whole ink composition. When the amount is in the above range, the resulting pigmented ink can have not only satisfactory color tone and optical density but also satisfactory viscosity and storage stability.

It is sufficient that the particle diameter of the pigment used in the present invention is 100 nm or less. When it is more than 100 nm, particles of the pigment are precipitated in some cases during long-term storage.

The amphiphilic compound used in the present invention preferably has a molecular weight of 1,000 to 5,000. When its molecular weight is in this range, the dispersibility and dispersion stability of pigment particles in the pigmented ink can be improved. The proportion of the poly(ethylene oxide) in the dispersant used in the present invention is 80 to 97 wt %, preferably 85 to 95 wt %, based on the total weight of the dispersant. When the proportion is in this range, the tendency of coagulation of pigment particles can be reduced, so that the ink can have a satisfactory storage stability.

As the amphiphilic compound used in the present invention, those having an alkylphenyl group as a hydrophobic portion are especially effective in improving the dispersibility of pigment particles. The reason can be guessed as follows: in general, pigments for ink-jet printers represented by organic pigments and carbon black have aromatic groups (e.g. phenyl groups, naphthyl groups, etc.) on the surface, and therefore, the alkylphenyl group is adsorbed on each aromatic group on the pigment surface more strongly, so that more effective dispersion of pigment particles becomes possible.

The amount of the amphiphilic compound added in the present invention is 0.1 to 20 wt %, preferably 0.1 to 10 wt %, based on the weight of the whole ink composition. When the amount is in the above range, the dispersibility of pigment particles and the storage stability of the ink can be improved.

The weight ratio of the pigment to the amphiphilic compound in the present invention is preferably 1:2 to 3:1. This is for attaining an excellent print quality.

If necessary, a commercially available nonionic or anionic dispersant may be used in combination with the amphiphilic compound used in the present invention, for dispersing the pigment.

Crusting of a print head with the pigmented ink of the present invention can be further reduced by incorporating the ink with (4) at least one water-soluble organic solvent selected from the group consisting of ethylene glycol, diethylene glycol and glycerol, and (5) at least one water-soluble compound formed by binding of two or three hydroxyl groups to a hydrocarbon of 4 to 6 carbon atoms, or a poly(ethylene glycol), in addition to (1) an organic pigment having a surface made hydrophobic by adsorption thereon or binding thereto of an organic substance, (2) an amphiphilic compound composed of a poly(ethylene oxide) as a hydrophilic portion and an alkyl group and/or an aromatic group as a hydrophobic portion, and (3) water.

The water-soluble organic solvent(s) used in the present invention may be at least one member selected from the group consisting of ethylene glycol, diethylene glycol and glycerol.

As the water-soluble compound(s) used in the present invention, there may be used either a single compound or a mixture of two or more compounds so long as the compound(s) is formed by binding of two or three hydroxyl groups to a hydrocarbon of 4 to 6 carbon atoms. The water-soluble compound includes, for example, 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-butanetriol, 1,2,6-hexanetriol, 1,2,5-pentanetriol, 3-methyl-1,5-pentanediol and 3-hexene-2,5-diol.

The molecular weight of the poly(ethylene glycol) used in the present invention ranges preferably from 200 to 2,000. This is for preventing nozzle clogging and the increase of the ink viscosity.

The total content of the water-soluble organic solvent(s) and the water-soluble compound(s) or the poly(ethylene glycol) in the present invention is preferably 8 to 25 wt %. This is for preventing nozzle clogging and attaining an excellent print quality without increasing drying time.

The weight ratio of the water-soluble organic solvent(s) to the water-soluble compound(s) or the poly(ethylene glycol) in the present invention ranges preferably from 2:1 to 1:5. This is for preventing nozzle clogging and attaining an excellent print quality without increasing drying time.

The weight ratio of the amphiphilic compound to the water-soluble compound(s) or the poly(ethylene glycol) in the present invention ranges preferably from 1:5 to 1:1. This is for preventing nozzle clogging.

For producing the pigmented ink of the present invention, at least the following components are mixed to effect dispersion: (1) an organic pigment having a surface made hydrophobic by adsorption thereon or binding thereto of an organic substance, (2) an amphiphilic compound composed of a poly(ethylene oxide) as a hydrophilic portion and an alkyl group and/or an aromatic group as a hydrophobic portion, (3) water, and optionally (4) at least one water-soluble organic solvent selected from the group consisting of ethylene glycol, diethylene glycol and glycerol, and (5) at least one water-soluble compound formed by binding of two or three hydroxyl groups to a hydrocarbon of 4 to 6 carbon atoms, or a poly(ethylene glycol). If necessary, various additives are added to the resulting dispersion to obtain the ink. It is also possible to prepare a dispersion having a high pigment concentration and dilute the dispersion with a solvent and various additives to obtain the ink.

In the present invention, there is used a mixed solvent of water and at least one water-soluble organic solvent selected from the group consisting of ethylene glycol, diethylene glycol and glycerol. Other organic solvents may be mixed with the mixed solvent without any problem. The other organic solvents include, for example, triethylene glycol, tripropylene glycol, dimethyl sulfoxide, diacetone alcohol, glycerol monoallyl ether, propylene glycol, poly(ethylene glycol)s, thiodiglycol, N-methyl-2-pyrrolidone, 2-pyrrolidone, γ-butyrolactone, 1,3-dimethyl-2-imidazolidinone, sulfolane, trimethylolpropane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monometyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1-butanol, 2,5-hexanediol, ethanol, n-propanol, 2-propanol, 1-methoxy-2-propanol, furfuryl alcohol and tetrahydrofurfuryl alcohol.

The surface tension of the pigmented ink obtained in the present invention is preferably 20 to 70 dyne/cm. The viscosity of the ink is preferably 10 cP or less, more preferably cP or less, at 25° C. Since water is usually used as a solvent in the ink, the viscosity of the ink is 1 cP or more. Since the pigmented ink obtained in the present invention has a surface tension and a viscosity in the above ranges, it permits stable printing with an ink-jet printer.

The organic pigment used in the present invention, i.e., the organic pigment having a surface made hydrophobic by adsorption thereon or binding thereto of an organic substance can be obtained by dispersing an organic pigment having no high surface hydrophobicity because of the influence of hydrophilic groups and the like, into a solution of an organic substance such as an organoalkoxysilane, organosilazane, acetoalkoxyaluminum diisporopylate the like. Since the organic substance such as the organoalkoxysilane, organosilazane, acetoalkoxy-aluminum diisopropylate or the like is physically adsorbed on or chemically bonded to the hydrophilic portions (e.g. hydrophilic groups) of the pigment surface, the hydrophobicity of the pigment surface is markedly improved, so that the hydrophobic portion of the amphiphilic compound composed of a poly(ethylene oxide) as hydrophilic portion and an alkyl group and/or an aromatic group as hydrophobic portion is strongly bonded to the pigment surface, resulting in markedly improved dispersibility of the pigment. As a solvent used in this case, water, organic solvents, or a mixture thereof can be used depending on the kind of said organic substance.

Needless to say, as the organic substance for making the surface of the organic pigment hydrophobic, any organic substance can be used without any particular limitation so long as it can be adsorbed on or bonded to the pigment surface.

As a dispersing machine for producing the pigmented ink of the present invention, any conventional dispersing machine may be used. There can be exemplified vessel-driven medium mills such as a roll mill, a ball mill, a centrifugal mill, a planetary ball mill, etc.; high-speed rotary mills such as a sand mill, etc.; and medium agitation mills such as an agitation tank type mill, etc. A specific example of process for producing the pigmented ink is a process of dispersing the pigment with a planetary mill or a sand mill by using ceramic beads having a diameter of 0.01 to 1.0 mm. When the planetary mill is used, the dispersion is preferably carried out at an acceleration of 5 to 50 G. When the sand mill is used, the dispersion is preferably carried out at a packing of 50 to 90% and a rotating speed of the blade of 5 to 20 m/s.

In the present invention, it is possible to use various additives conventionally used in inks for ink-jet printers, such as surfactants, agents for preventing clogging of a print head, a defoaming agents for ink, drying-preventing agents, bactericides, humectants, pH adjustors, agents for imparting waterfastness to printed letters, etc., in combination with the components described above.

The ink of the present invention can be used not only as ink for an ink-jet printer but also as common water-based printing ink or paint. Moreover, the pigmented ink obtained in the present invention can be used after being changed into a non-aqueous ink or paint by replacement of the aqueous solvent.

DESCRIPTION OF THE PREFERRED EMBODIMENTS

The present invention is explained in further detail with reference to the following specific examples.

EXAMPLE 1

The following ingredients were mixed while applying ultrasonic waves, to effect dispersion. The dispersion was filtered and the residue was dried to obtain a yellow pigment having a surface made hydrophobic by adsorption thereon or binding thereto of an organic substance. This surface-modified yellow pigment floated on water and was not dispersible into water at all, though unmodified yellow pigment had been well dispersible into water.

| | |
|---|---|
| Organoalkoxysilane $((CH_3)_2CHCH_2Si(OCH_3)_3)$ | 1 part by weight |
| Yellow pigment (Pigment Yellow 74) | 500 parts by weight |
| Toluene | 400 parts by weight |

Subsequently, the following ingredients were mixed by means of a sand mill for 2 hours by using zirconia beads with a diameter of 0.3 mm, to obtain a despersion:

| | |
|---|---|
| The yellow pigment having a surface made hydrophobic | 14 parts by weight |
| Polyethylene oxide nonylphenyl ether (Nonypol ® 400, a trade name, mfd, by Sanyo Chemical Industries, Ltd.) | 8 parts by weight |
| Ion-exchanged water | 78 parts by weight |

To 35 parts by weight of this dispersion were added dropwise 8 parts by weight of diethylene glycol, 7 parts by weight of 1,5-pentanediol and 52 parts by weight of ion-exchanged water with stirring over a period of 30 minutes to obtain an ink.

EXAMPLE 2

A pigmented ink was obtained in the same manner as in Example 1 except for using hexamethyl-disilazane $((CH_3)_3SiNHSi(CH_3)_3)$ in place of the organo-alkoxysilane $((CH_3)_2CHCH_2Si(OCH_3)_3)$ in the same amount as in Example 1.

EXAMPLE 3

A pigmented ink was obtained in the same manner as in Example 1 except for using acetoalkoxyaluminum diisopropylate in place of the organoalkoxysilane $((CH_3)_2CHCH_2Si(OCH_3)_3)$ in the same amount as in Example 1.

EXAMPLE 4

A pigmented ink was obtained in the same manner as in Example 1 except for using hexamethyl-disilazane $((CH_3)_3SiNHSi(CH_3)_3)$ and a magenta pigment (Pigment Red 122) in place of the organoalkoxysilane $((CH_3)_2CHCH_2Si(OCH_3)_3)$ and the yellow pigment (Pigment Yellow 74), respectively, in the same amounts as in Example 1.

COMPARATIVE EXAMPLE 1

A pigmented ink was obtained in the same manner as in Example 1 except for using a surface-unmodified yellow pigment (Pigment Yellow 74) without modifying the surface by adsorption thereon or binding thereto of an organic substance, in place of the surface-modified yellow pigment in the same amount as that of this pigment.

COMPARATIVE EXAMPLE 2

A pigmented ink was obtained in the same manner as in Example 1 except for using a surface-unmodified magenta pigment (Pigment Red 122) without modifying the surface by adsorption thereon or binding thereto of an organic substance, in place of the surface-modified magenta pigment in the same amount as that of this pigment.

Table 1 shows the storage stability of the inks obtained in Examples, the re-dispersibility in the inks, the viscosity of the inks, clogging of an print head with the inks, and the print quality given by the inks.

TABLE 1

|  | Storage stability | Re-dispersibility | Viscosity (cps) | Clogging | Print quality | Particle diameter of pigment |
|---|---|---|---|---|---|---|
| Example 1 | ○ | ○ | 2.8 | ○ | 1.3 | 35 |
| Example 2 | ○ | ○ | 3.1 | ○ | 1.3 | 38 |
| Example 3 | ○ | ○ | 2.6 | ○ | 1.4 | 30 |
| Example 4 | ○ | ○ | 3.2 | ○ | 1.5 | 27 |
| Comparative Example 1 | Δ | Δ | 6.2 | X | 1.1 | 55 |
| Comparative Example 2 | X | X | 9.8 | X | 1.2 | 52 |

In Table 1, the rating (mark) for the storage stability is as follows; ×: the viscosity of the ink after standing at 70° C. for 7 days was more than 1.5 times that before the standing, Δ: the viscosity after the standing was 1.1 to 1.5 times that before the standing, and ○: the viscosity after the standing was less than 1.1 times that before the standing. The re-dispersibility was evaluated by forcedly precipitating the pigment in the ink by centrifugation with a centrifuge at 10,000 G for 3 hours. The rating (mark) for the re-dispersibility is as follows; ○: easy re-dispersion of the pigment, and Δ: difficult re-dispersion of the pigment. The viscosity was measured at 25° C. with a viscometer (Model 100 mfd. by Toki Sangyo Co., Ltd.). The clogging of an ink head was investigated by printing a definite number of letters, allowing the ink head to stand at 50° C. for 7 days without capping and the like, carrying out a cleaning procedure for obviating nozzle clogging, and judging the number of repetitions of the cleaning procedure required for normal printing. The number of repetitions of the cleaning procedure required for normal printing is marked as follows; ○: 1 to 5 times, Δ: 6 to 10 times, and ×: 11 times or more. The print quality was evaluated by printing a recording pattern on plane paper with an ink-jet printer, and measuring the optical density with a Macbeth portable densitometer (RD-12000, mfd. by Sakata Inx Co., Ltd.). The diameter of each pigment was measured with a centrifugal sedimentation type particle size distribution meter.

As is clear from Table 1, since the pigment in each of the pigmented inks of the present invention has a surface made hydrophobic by absorption thereon or binding thereto of an organic substance, the interaction between the pigment and the amphiphilic compound composed of a poly(ethylene oxide) as a hydrophilic portion and an alkyl group and/or an aromatic group as a hydrophobic portion is strengthened, so that the dispersibility and dispersion stability of pigment particles are greatly improved, resulting in markedly improved storage stability and re-dispersibility of the ink.

What is claimed is:

1. A pigmented ink comprising at least (1) an organic pigment having a surface made hydrophobic by adsorption thereon or binding thereto of an organic substance, (2) an amphiphilic compound composed of a poly(ethylene oxide) as a hydrophilic portion and an alkyl group and/or an aromatic group as a hydrophobic portion, and (3) water, wherein said organic substance is selected from a group consisting of organoalkoxysilanes, organosilazanes, and acetoalkoxyaluminum diisopropylates.

2. A process for producing a pigmented ink which comprises dispersing an organic pigment into a solution of an organic substance, and dispersing the organic pigment having a surface made hydrophobic by adsorption thereon or binding thereto of the organic substance, in the presence of water and an amphiphilic compound composed of a poly(ethylene oxide) as a hydrophilic portion and an alkyl group and/or an aromatic group as a hydrophobic portion, by using ceramic beads having a diameter of 0.01 to 1.0 mm, wherein said organic substance is selected from a group consisting of organoalkoxysilanes, organosilazanes, and acetoalkoxyaluminum diisopropylates.

3. The pigmented ink of claim 1, wherein said amphiphilic compound may contain at least one member selected from the group consisting of carboxylic acid groups, carboxylic acid salt groups, sulfate ester groups, sulfate ester salt groups, sulfonic acid group, sulfonic acid salt groups, phosphoric ester groups and phosphoric ester salt groups.

4. The pigmented ink of claim 1, wherein said pigmented ink has a pH in the range of 7 to 11.

5. The pigmented ink of claim 1, wherein an amount of said organic pigment is 0.1 to 20 wt % based on the weight of the pigmented ink.

6. The pigmented ink of claim 1, wherein the particle diameter of the organic pigment is 100 nm or less.

7. The pigmented ink of claim 1, wherein said amphiphilic compound has a molecular weight of 1000 to 5000.

8. The pigmented ink of claim 1, wherein the amount of said amphiphilic compound is 0.1 to 20 wt % based on the weight of the pigmented ink.

9. The pigmented ink of claim 1, wherein a weight ratio of said organic pigment to said amphiphilic compound is 1:2 to 3:1.

10. The pigmented ink of claim 1, further comprising at least one water-soluble organic solvent selected from the group consisting of ethylene glycol, diethylene glycol and glycerol.

11. The pigmented ink of claim 10, further comprising at least one water-soluble compound formed by the binding of two or three hydroxyl groups to a hydrocarbon of 4 to 6 carbon atoms or a poly(ethylene glycol).

* * * * *